(No Model.)

C. C. BRADLEY.
CARRIAGE SPRING.

No. 305,888. Patented Sept. 30, 1884.

Theo. L. Popp,
Geo. E. Pitman } Witnesses.

C. C. Bradley, Inventor.
By Wilhelm Bonner
Attorneys.

UNITED STATES PATENT OFFICE.

CHRISTOPHER C. BRADLEY, OF SYRACUSE, NEW YORK.

CARRIAGE-SPRING.

SPECIFICATION forming part of Letters Patent No. 305,888, dated September 30, 1884.

Application filed May 29, 1884. (No model.)

*To all whom it may concern:*

Be it known that I, CHRISTOPHER C. BRADLEY, of the city of Syracuse, in the county of Onondaga and State of New York, have invented new and useful Improvements in Carriage-Springs, of which the following is a specification.

This invention relates to an improvement in that class of carriage-springs which are provided at their ends with trunnions resting in sockets or bearings formed in couplings, whereby the side and end springs are connected, or by which the springs are attached to the bolsters or other supports.

The object of my invention is to provide a simple means for securing the spring detachably to the socket, while permitting the trunnion to turn in the socket to render the joint noiseless and to exclude the dust from the bearing-surfaces.

With these ends in view my invention consists of the improvements which will be hereinafter fully set forth, and pointed out in the claims.

Figure 1:
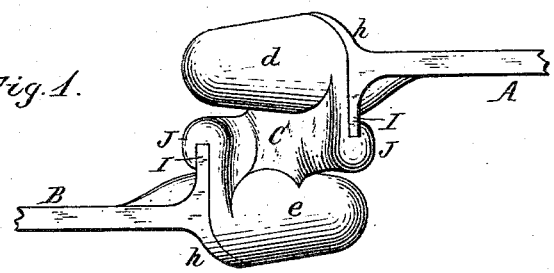
Figure 2:
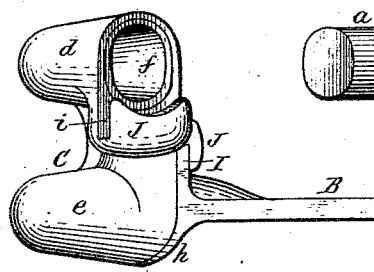
Figure 3:
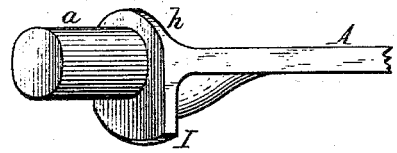
Figure 4:
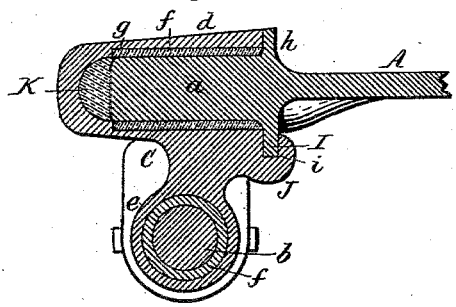
Figure 6:
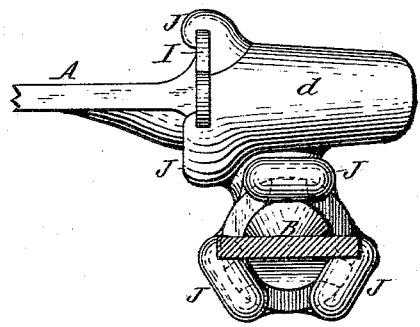
Figure 5:
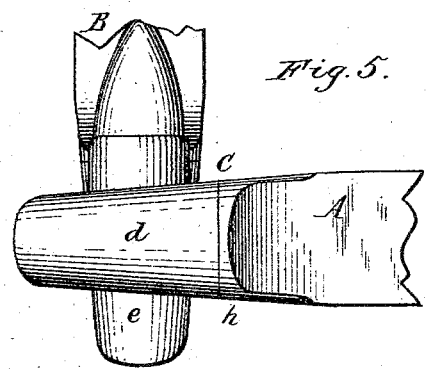
Figure 7:
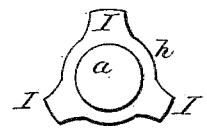

In the accompanying drawings, Figure 1 is a perspective view of the connected ends of two springs provided with my improvements. Fig. 2 is a perspective view of the joint with the end spring removed. Fig. 3 is a perspective view of the end of a spring. Fig. 4 is a sectional elevation in the line of one of the trunnions. Fig. 5 is a top plan view of the connected ends of two springs. Fig. 6 is a side elevation showing a slightly-modified construction of my improvements. Fig. 7 is an end elevation of the spring in the last-named construction.

Like letters of reference refer to like parts in the several figures.

A represents the cross or end spring, and B the side spring, of a vehicle; and $a$ and $b$ represent the trunnions or journals formed, respectively, on the ends of the springs A and B.

C represents a coupling, whereby the adjacent ends of an end and a side spring are connected together. The coupling C is provided with two sockets, $d$ and $e$, arranged at right angles to each other, and one above the other, so as to receive the trunnions $a$ and $b$. Each socket is constructed with a smooth inner bearing-surface and a closed outer end, which latter covers the end of the trunnion and excludes dust, &c., from the bearing-surfaces of the trunnion and socket. The inner bearing-surface of the socket may be formed of the metal of which the coupling is constructed; but I prefer to line the socket with a cylinder, $f$, of leather or other soft material, which is seated in a recess, $g$, formed in the socket, and which fits snugly around the trunnion.

$h$ represents a collar or shoulder formed on each spring between its blade and trunnion; and I is an ear or lug formed on such collar, or otherwise secured to the spring at right angles to the trunnion.

J is a curved lip formed on the coupling C, so as to bear against the rear side of the ear I when the trunnion is inserted in the socket and the spring and socket are in their normal position. A space or groove, $i$, is formed between the lip J and the body of the socket for the reception of the ear I. The latter and the lip J are so arranged on their respective supporting parts that the lip J will bear against the ear I when the spring and socket are in their normal position, thereby securing the trunnion in its socket in this position of the parts, while permitting the requisite limited turning movement of the trunnion in its socket to enable the spring to adapt itself freely to the movements of the vehicle. Upon turning the spring or the socket so as to disengage the lip J and ear I from each other, the trunnion can be withdrawn from the socket.

In the construction represented in Figs. 1 to 5 each spring is provided with one ear I, and each socket with one lip J. In the modification represented in Figs. 6 and 7 each spring is provided with three ears I, and each socket with three lips J.

K represents a washer of rubber, leather, or other yielding material arranged in the socket between the end of the trunnion and the end of the socket. This washer is compressed in inserting the trunnion into the socket and takes up any longitudinal play which the ear I may have in the space $i$, in which it moves, thereby insuring a snug fit of the ear I in the space $i$.

I have illustrated my improvements as applied to a coupling which connects the ends of two springs; but they are equally applicable to sockets which are secured to the ends of bolsters and other spring-supports.

My improvements furnish a socket with a smooth inner bearing-surface, in which the trunnion of the spring turns freely without causing any lengthwise movement of the parts, and in which the bearing-surfaces are completely inclosed, and thereby protected against dust, &c., and in which the parts are held snugly, so as to be noiseless in use.

I claim as my invention—

1. The combination, with a carriage-spring having a trunnion at its end and a socket in which said trunnion is seated, of interlocking parts formed, respectively, on the trunnion and socket and securing the spring and socket together when these parts are in their normal position, while permitting the parts to be separated upon placing them in an abnormal position, substantially as set forth.

2. The combination, with a carriage-spring having at its end a trunnion and a projecting ear, of a socket having at its inner end a projecting lip adapted to bear against said ear, whereby the socket and spring are secured together in the normal position of the parts, while permitting the trunnion to be withdrawn from the socket upon placing the parts in an abnormal position, substantially as set forth.

3. The combination, with a carriage-spring having at its end a trunnion and a projecting ear, of a socket having a closed outer end, and provided at its inner end with a lip bearing against the ear of the spring in the normal position of the parts, substantially as set forth.

4. The combination, with a spring having a trunnion at its end, of a socket having a closed outer end, a yielding washer interposed between the ends of the trunnion and socket, and interlocking parts formed on the socket and spring near the inner end of the socket, whereby the latter and the spring are secured together, substantially as set forth.

5. The combination, with a spring having a trunnion at its end, of a socket having a closed outer end and an internal recess, a lining seated in said recess, and interlocking parts formed on the socket and spring near the inner end of the socket, whereby the latter and the spring are secured together, substantially as set forth.

Witness my hand this 26th day of May, 1884.

CHRISTOPHER C. BRADLEY.

Witnesses:
CALVIN S. BUNNELL,
ORLANDO C. WEST.